Figure 1:
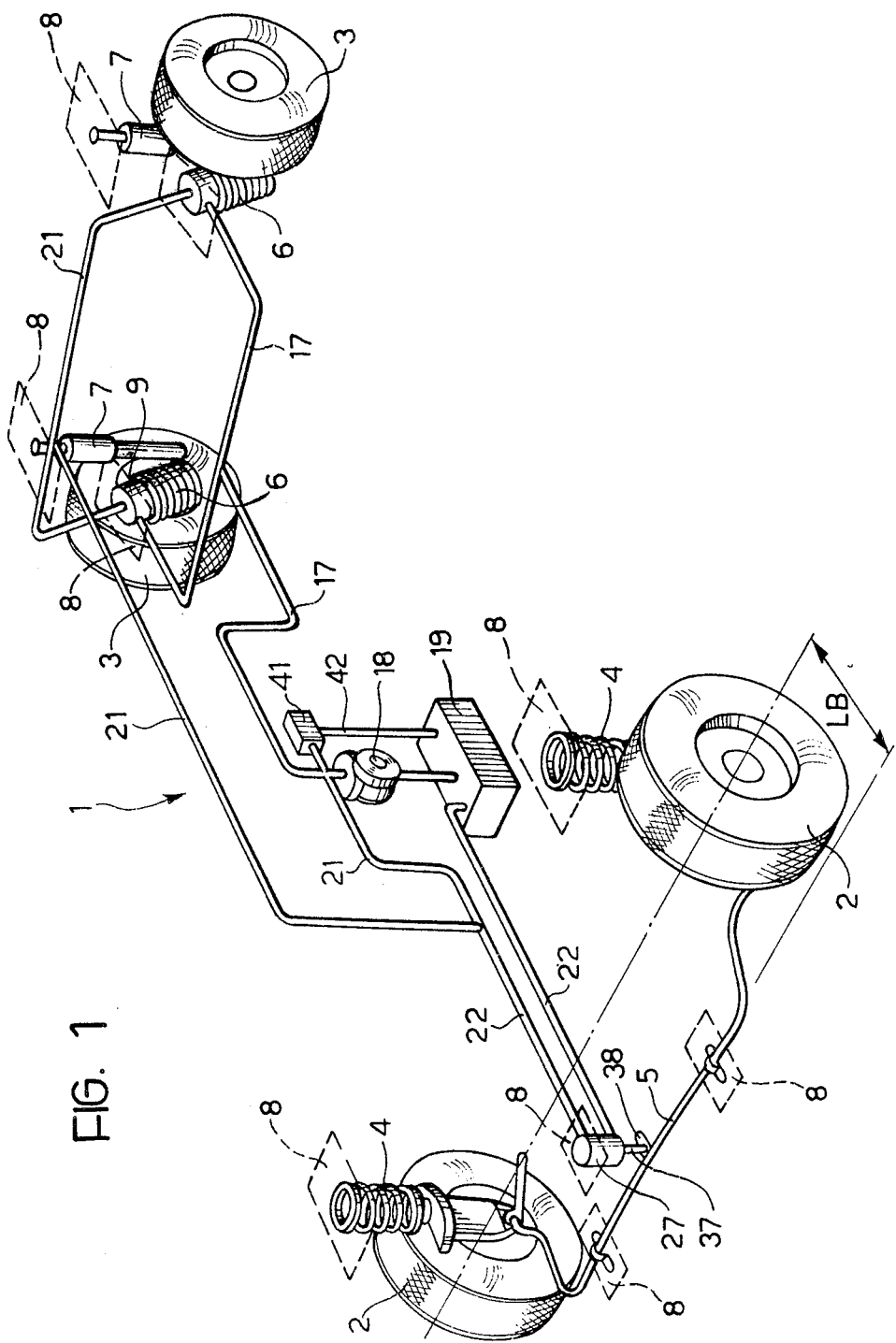

United States Patent [19]

Dotti et al.

[11] 4,350,354

[45] Sep. 21, 1982

[54] SELF-LEVELLING SUSPENSION SYSTEM FOR MOTOR-VEHICLES

[75] Inventors: Giulio Dotti, Milan; Renzo Masoero, Turin, both of Italy

[73] Assignee: Centro Ricerche Fiat S.p.A., Turin, Italy

[21] Appl. No.: 214,908

[22] Filed: Dec. 10, 1980

[30] Foreign Application Priority Data

Jan. 7, 1980 [IT] Italy .............................. 67012 A/80

[51] Int. Cl.³ .......................................... B60G 17/00
[52] U.S. Cl. .................................. 280/6 H; 280/6.1;
267/11 R
[58] Field of Search ............... 280/6 H, 6.1, 104, 714;
267/11 R

[56] References Cited

U.S. PATENT DOCUMENTS

| 3,028,175 | 4/1962 | Eckman | 280/6.1 |
| 3,083,026 | 3/1963 | Broadwell | 280/6 H |
| 3,550,992 | 12/1970 | Grancon | 280/6 H |
| 3,556,542 | 1/1971 | Capgras | 280/6 H |

FOREIGN PATENT DOCUMENTS

| 1260844 | 1/1972 | United Kingdom | 280/6.1 |
| 1337241 | 11/1973 | United Kingdom | 280/6.1 |

Primary Examiner—Robert R. Song

Attorney, Agent, or Firm—Sughrue, Mion, Zinn, Macpeak & Seas

[57] ABSTRACT

A suspension system for motor vehicles of the type designed to maintain automatically the horizontal attitude of a motor vehicle with variations in loads on the front suspensions and on the rear suspensions comprises two hydraulic cylinders interposed between the springs of the rear suspensions and the suspended masses in correspondence with the rear axle of the motor vehicle. Each hydraulic cylinder incorporates a distribution valve comprising a slide valve subject at one of its ends to the pressure within the hydraulic cylinder and its opposite end to the pressure transmitted by a hydraulic pump by means of a control valve which is responsive to the subsidence of the front suspensions. The said distribution slide valve is designed to connect the hydraulic cylinder to exhaust when pressure is transmitted from the said control valve and to connect the internal chambers of the hydraulic cylinder to a pipe directly connected to the outlet of the hydraulic pump when there is pressure inside the hydraulic cylinder. A spring acting as a sensor element of variations in length of the hydraulic cylinder is designed to return the slide valve to one of its conditions of equilibrium, in which the internal chamber of the hydraulic cylinder is isolated, when the motor vehicle becomes situated in a horizontal attitude.

10 Claims, 7 Drawing Figures

SELF-LEVELLING SUSPENSION SYSTEM FOR MOTOR-VEHICLES

The present invention relates to suspension systems for motor vehicles, of the type comprising:

means for sensing subsidence of the front suspensions of the motor vehicle, means for sensing subsidence of the rear suspensions of the motor vehicle, actuator means to vary the level of the suspended masses in correspondence with the rear axle of the motor vehicle, and control means, controlled by the said sensor means, designed to cause the operation of the said actuator means in order to maintain automatically the horizontal attitude of the motor vehicle upon variations in the loads on the front suspensions and on the rear suspensions.

Suspension systems of the type specified above are described and illustrated for example in British Pat. Nos. 1,337,241 and 1,260,844.

The object of the present invention is to provide a suspension system for motor vehicles of the type specified above which is of reliable and simple construction and which has, in particular, a smaller number of parts.

In order to achieve this object, the present invention provides a suspension system for motor vehicles of the type specified at the beginning, characterised by the following combination of characteristics:

(a) the said system comprises at least one hydraulic cylinder, interposed between the springs of the rear suspension and the suspended masses of the motor vehicle, which is designed to function at the same time as the actuator member and as the member for sensing the subsidence of the rear supensions, the said hydraulic cylinder comprising two members, fixed to the springs of the rear suspensions and to the suspended masses of the motor vehicle respectively, which define between them an internal chamber, (b) the said system further comprises a tank and a hydraulic pump the inlet to which is connected to the tank and the outlet from which is connected to a first input of the said hydraulic cylinder through a first pipe and to a second input of the said hydraulic cylinder through a second pipe, (c) the means for sensing the subsidence of the front suspensions comprise a control valve for controlling the pressure existing in the said second pipe, the said control valve comprising a movable control member designed to be displaced as a function of the subsidence of the front suspension, in order to cause an increase in the pressure in the second pipe as the subsidence of the front suspensions increases, (d) the control means comprise a distribution valve incorporated in one of the two members forming the hydraulic cylinder and including a slide valve subject at one of its ends to the pressure transmitted through the said second input and at its opposite end to the pressure exising in the internal chamber of the hydraulic cylinder, the said slide valve being displaceable between a first end position, corresponding to the situation where pressure is transmitted through the said second input, in which the internal chamber of the hydraulic cylinder is connected to exhaust so as to cause retraction of the hydraulic cylinder, and a second end position, corresponding to the situation where there is pressure in the internal chamber of the hydraulic cylinder, in which the said internal chamber is put in communication with the said first input, so as to cause extension of the hydraulic cylinder, (e) the control means further comprise a spring acting as the element for sensing the variation in length of the hydraulic cylinder, interposed between the slide valve associated with one of the two elements forming the hydraulic cylinder and the other element of the hydraulic cylinder, the said spring being designed to bring the slide valve back into one of its positions of equilibrium, in which the internal chamber of the hydraulic cylinder is isolated, when the vehicle becomes situated in a horizontal attitude.

Figure 2:
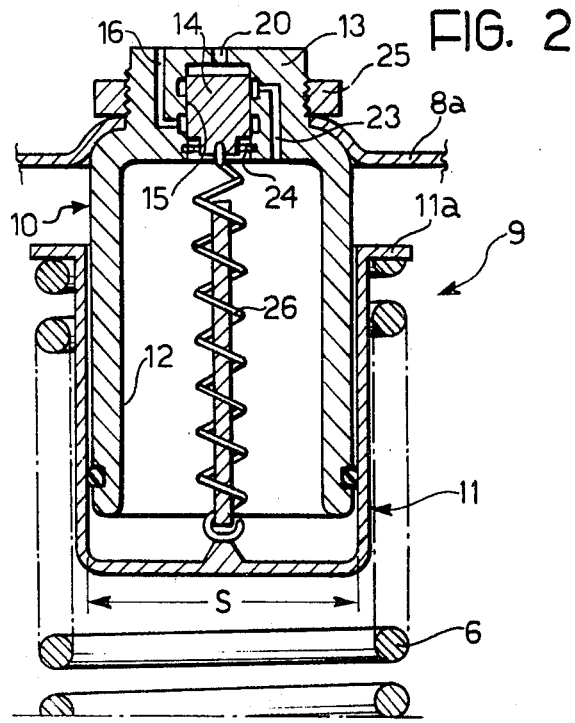
Figure 5:
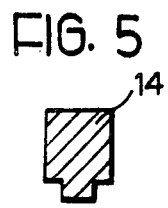
Figure 6:
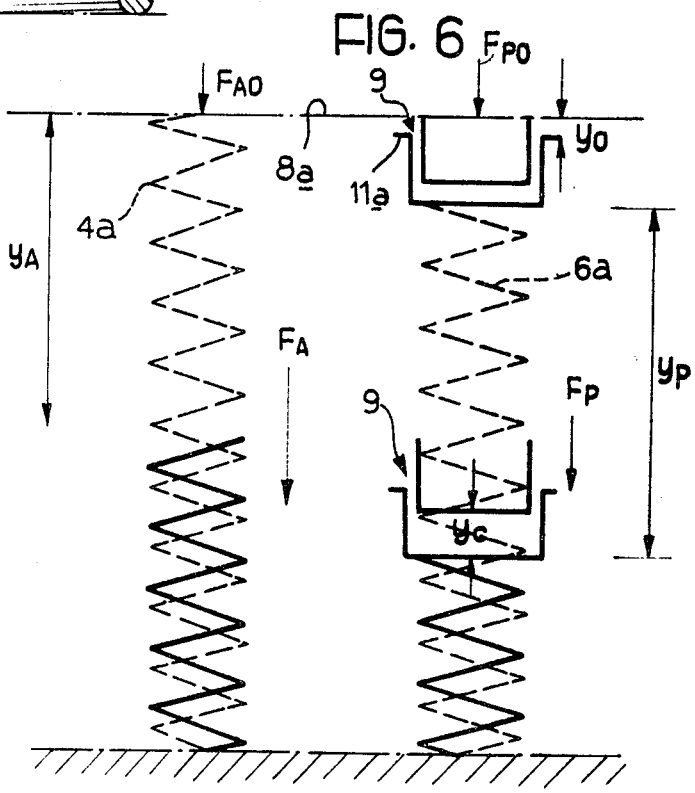
Figure 3:
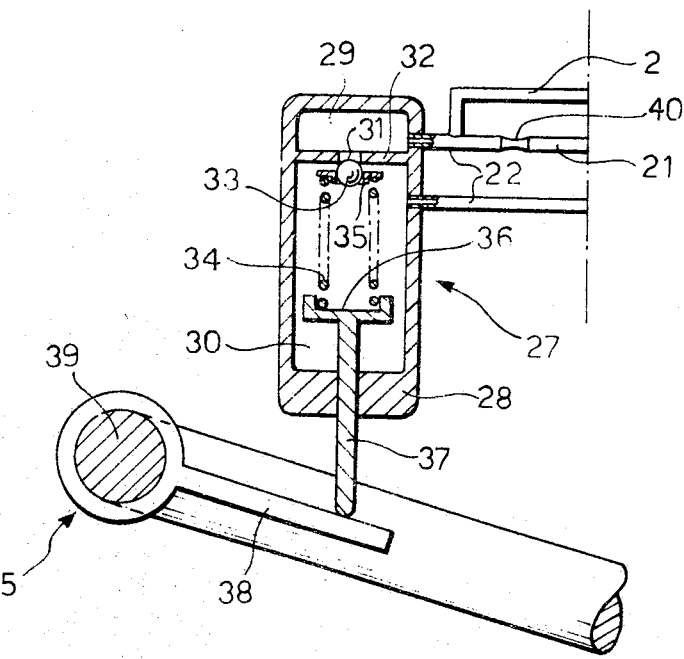
Figure 4:
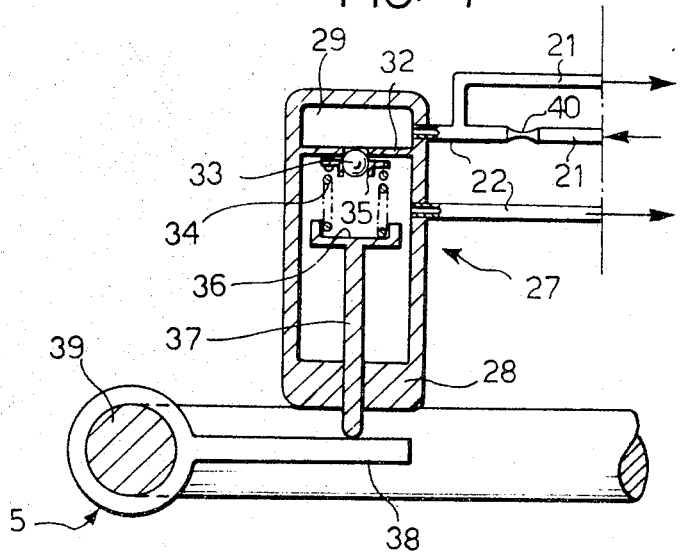
Figure 7:
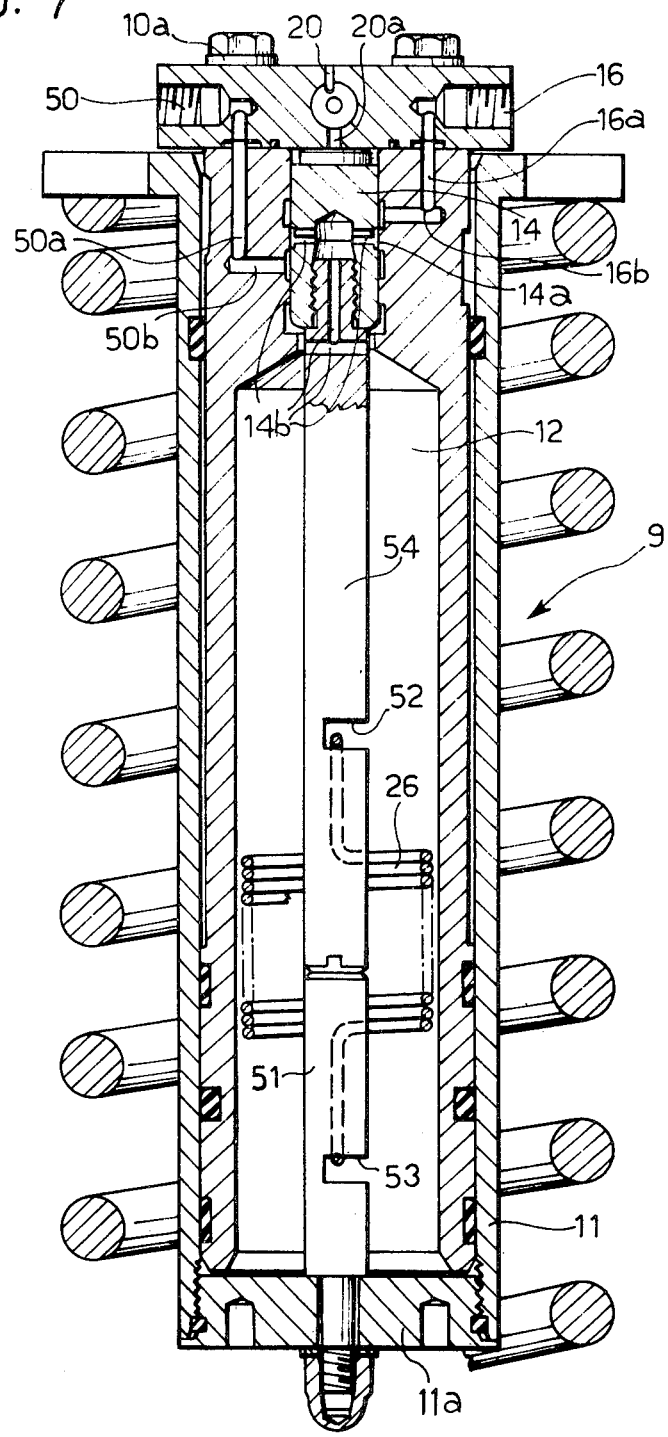

The present invention will now be described with reference to the accompanying drawings, supplied purely by way of non-limitative example, in which:

FIG. 1 is a diagrammatic perspective view of a suspension system according to the present invention, FIG. 2 is a sectional diagrammatic view of a hydraulic cylinder forming part of the system of FIG. 1, FIGS. 3, 4 show a control valve forming part of the system of FIG. 1 in two different working conditions, FIGS. 5, 6 show the principle of operation of the suspension system according to the present invention, and FIG. 7 is a variant of FIG. 2.

In FIG. 1, reference numeral 1 indicates in its entirety a suspension system associated with a vehicle comprising two front wheels 2 and two rear wheels 3. Associated with the front wheels 2 are two suspension springs 4 and a stabilizing torsion bar 5. Associated with the rear wheels 3 are two suspension springs 6 and two shock absorbers 7. Reference numeral 8 indicates fragmentary parts of the suspended mass of the motor vehicle.

With each of the springs 6 of the rear suspension there is associated a hydraulic cylinder 9 (see FIG. 2) which is interposed between the corresponding spring 6 and the suspended mass 8 of the motor vehicle. The hydraulic cylinder 9 comprises two elements 10,11, susbtantially cup-shaped, assembled slidingly one inside the other with their cavities facing each other, so as to define an internal chamber 12. In the base portion of the cup element 10 there is incorporated a distribution valve 13 comprising a slide valve 14 assembled slidingly inside a cavity 15 which extends coaxially with the hydraulic cylinder 9 from the surface of the base portion of the cup element 10 which is facing the internal chamber 12.

The cavity 15 communicates through a first inlet 16 with a first pipe 17 connected to the outlet of a hydraulic pump 18. The input to the pump 18 is connected to a tank 19. The cavity 15 also communicates through a second inlet 20 with a second pipe 21 connected to the output of the hydraulic pump 18. The second pipe 21 also communicates through a third pipe 22 with the tank 19. Finally, the cavity 15 inside which the slide valve 14 is assembled slidingly also communicates, with a pipe 23 which leads to the internal chamber 12 of the hydraulic cylinder.

The slide valve 14 is displaceable between a first end position, corresponding to the abutment of its lower surface against a stop ring 24 and a second end position corresponding to the abutment of the upper surface of the valve against the upper end surface of the cavity 15.

When the slide valve 14 is situated in its first end position, the second inlet 20 communicates through the duct 23, with the internal chamber 12. When, however, the valve 14 is situated in its second end position, the internal chamber 12 communicates instead with the first inlet 16.

The cup element 10 is secured to a support 8a fixed to the suspended masses 8 of the motor vehicle by means of a ring nut 25 secured onto the base portion of the elemtn 10. The cup element 11 is provided instead with an annular flange 11a which rests on the upper end of the spring 6. Between the slide valve 14 and the base of the cup element 11 there is axially interposed a helical spring 26, the function of which will become apparent in due course. In FIG. 2, the slide valve 14 is shown in an intermediate position of equilibrium between its two end positions, in correspondence with which the internal chamber 12 of the hydraulic cylinder 9 does not communicate with the first inlet 16 nor with the second inlet 20.

In the duct 22 (see FIG. 1) which puts the duct 21 in communication with the tank 19, there is interposed a control valve 27 comprising a body 28, fixed to the suspended masses 8 of the motor vehicle, inside which are defined two chambers 29, 30 which communicate with each other by means of an aperture 31 made in a baffle 32 which separates these chambers from each other. The chamber 29 communicates with the pipe 21, whilst the chamber 30 communicates, through the pipe 22 with the tank 19. The edge of the aperture 31 functions as a seat for a ball obturator 33 which is pressed against it by a helical spring 34. The helical spring 34, which is arranged inside the chamber 30, acts at one of its ends on the ball obturator 33 by means of a cap 35, and at its other end against a seat 36 made at the end of an element 37 assembled slidingly in the body 28 and having one end protruding outside the latter. This end of the element 37 co-operates with a lever arm 38 which is fixed to the stabilizing bar 5 and which rotates around the axis 39 of this bar with the variation in the subsidence of the front suspensions of the motor vehicle.

In the section of the pipe 21 comprised between the output of the hydraulic pump 18 and the point at which this duct communicates with the pipe 22 there is interposed a constriction 40 for the purpose of preventing the pressure in the pipe 22 being influenced by the pressure existing in the pipe 17.

Reference numeral 41 indicates a valve interposed in a pipe 42 which puts the output of the hydraulic pump 18 in communication with the tank 19.

The operation of the suspension system described above is as follows:

When the motor vehicle is situated in horizontal attitude, the slide valve 14 of each hydraulic cylinder 9 is situated in its equilibrium position shown in FIG. 2.

Supposing that in these conditions an increase occurs in the load acting on the front suspensions of the motor vehicle, this increase will cause subsidence of the front suspensions and, as a result, a lowering of the suspended masses 8 of the motor vehicle with respect to the front wheels 2. The body 28 of the control valve 27 and the stabilizing bar 5 lower at the same time as the suspended masses 8 with respect to the wheels of the motor vehicle. This lowering is therefore accompanied in addition by a rotation of the central section of the stabilizing bar 5 around its axis 39. This rotation causes a corresponding rotation of the lever arm 38 fixed with the stabilizing bar, which is thus brought from the position shown in FIG. 3, for example into the position shown in FIG. 4. The rotation of the lever arm 38 causes the retraction of the element 37 inside the chamber 30 of the valve 27, with a resulting increase the pre-load of the helical spring 34.

When the motor vehicle is in a horizontal attitude (in this condition the control valve 27 is situated in the position shown in FIG. 3) the fluid supplied by the hydraulic pump 18 flows through the pipe 21 and the pipe 22 into the internal chamber 29 of the control valve 27 and from here passes into the chamber 30 after having caused the withdrawal of the ball obturator 33 by overcoming the reaction of the spring 34. From the chamber 30 the fluid then returns into the tank 19 through the pipe 22. Since, with the increase in the subsidence of the front suspensions, the pre-load of the helical spring 34 increases through the effect of the rectraction of the element 37 inside the chamber 30, the fluid supplied by the pump 18 must overcome an even greater reaction force in order to cause the withdrawal of the valve obturator 33 as the subsidence of the front suspensions increases. It is clear, therefore, that as this subsidence increases, so the pressure increases in the section of the pipe 21 which is arranged downstream of the point which communicates with the pipe 22.

Finally, to the second input 20 of each hydraulic cylinder 9 a pressure is transmitted which is a function of the subsidence of the front wheels of the motor vehicle.

The slide valve 14 associated with each hydraulic cylinder 9 would tend to be displaced downwards, towards its first end position, through the effect of the action of the pressure transmitted through the input 20 and of the action of the helical spring 26. On the other hand the slide valve 14 is thrust upwards by the pressure existing in the internal chamber 12.

Supposing that the subsidence of the front suspensions is such that it causes a sufficient increase in the pressure transmitted to the inlet 20 through the pipe 21, the slide valve 14 associated with each hydraulic cylinder 9 moves downwards putting the internal chamber 12 of the hydraulic cylinder in communicaton with the inlet 20. Since the system is designed in such a way that the pressure transmitted to the inlet 20 is always less than the pressure existing inside the chamber 12, the connection between the inlet 20 and the chamber 12 causes the discharge of the fluid contained in the latter through the duct 23 and the inlet 20, the pipe 21, and the pipe 22 into the tank 19. As a result, the hydraulic cylinders 9 retract, as a result of which the lowering of the front part of the motor vehicle which had suffered a deviation from the horizontal attitude is followed by a corresponding lowering of the rear part of the motor vehicle.

Naturally, as each hydraulic cylinder retracts, the action exerted by the spring 26 on the slide valve 14 and tending to push this valve downwards diminishes. The system is designed in such a way that when the retraction of the hydraulic cylinders 9 is such that it establishes the horizontal attitude of the motor vehicle, each slide valve 14 returns to its position of equilibrium, interrupting the communication of the chamber 12 with the tank 19.

In this phase of operation therefore each hydraulic cylinder 9 functions as an actuator member designed to change the level of the suspended masses on the rear suspension of the motor vehicle so as to maintain automatically the horizontal attitude of the said vehicle.

The helical spring 26 functions, in some respect, as the member for sensing the variation in the length of the hydraulic cylinder 9 and has the task of acting in such a way that the slide valve 14 returns to its position of equilibrium when the motor vehicle becomes situated in the horizontal attitude.

Supposing now that the motor vehicle deviates from its horizontal attitude as a result of an increase in the load on the rear suspensions, this increase tends to cause the two cup elements 10, 11 forming each hydraulic cylinder 9 to approach each other in the axial direction. The increase in pressure inside the chamber 12 caused by this approaching movment tends to move the slide valve 14 upwards its second end position.

If the increase in the load on the rear suspension is such that it causes inside the chamber 12 a pressure sufficient to bring the slide valve 14 into its second end position, overcoming the action of the helical spring 26, the internal chamber 12 is put in communication with the output of the hydraulic pump 18 through the inlet 16 and the pipe 17.

In this phase of operation, as may be seen, each hydraulic cylinder 9 functions as a member for sensing the subsidence of the rear suspensions.

Once put in communication with the output of the pump 18, the chamber 12 receives the fluid supplied by the said pump, as a result of which the two cup elements 10,11 tend to move away from each other axially, causing a lengthening of the hydraulic cylinder 9.

The lowering of the rear part of the motor vehicle which had given rise to a deviation of the vehicle from the horizontal attitude is thus immediately followed by a raising of the said rear part of the motor vehicle through the effect of the lengthening of the hydraulic cylinders 9 interposed between the suspension springs 6 and the suspended masses 8 of the motor vehicle.

In this phase of operation the hydraulic cylinders 9 function, as already described above, as actuator members designed to cause a variation in the level of the rear part of the motor vehicle.

It may be concluded, therefore, that, in the system according to the present invention, the means for sensing subsidence of the front suspensions comprise the control valve 27, whilst the hydraulic cylinders 9 are used at the same time both as means for sensing subsidence of the rear suspensions, and as actuator means for effecting variation in the level of the suspended masses in correspondence with the rear axle of the motor vehicle. The helical spring 26 associated with each hydraulic cylinder 9 functions, finally, as the member for sensing the variation in the length of the hydraulic cylinder and is intended to re-establish the condition of equilibrium when the horizontal attitude of the vehicle is regained.

For the correct functioning of the suspension system described above it is necessary that the slide valve 14 associated with each hydraulic cylinder 9 should become situated in its position of equilibrium when the motor vehicle regains its horizontal attitude.

In FIG. 6 the reference numeral 4a indicates a spring which represents the springs 4 of the front supension of the motor vehicle. The rigidity of the spring 4a corresponds therefore to the sum of the rigidities of the springs 4 of the front suspension. The reference numeral 6a indicates a spring corresponding to the springs 6 of the rear suspension of the motor vehicle. The rigidity of the spring 6a corresponds therefore to the sum of the rigidities of the springs 6 of the rear suspension. In the drawings there is also shown diagrammatically a hydraulic cylinder 9 associated with the spring 6a.

The springs 4a and 6a are represented by dashed lines in their configuration corresponding to the condition in which the motor vehicle is empty, and by continuous lines in their configuration corresponding to the condition of the vehicle subjected to a general load on the front axle and on the rear axle.

By $y_O$ is indicated the distance between the annular flange 11a and the support 8a associated with the hydraulic cylinder 9 when the motor vehicle is in its empty condition and in a horizontal attitude.

By $F_{AO}$ and by $F_{pO}$ are indicated the loads acting on the springs 4a, 6a respectively in the empty condition of the vehicle.

By $F_A$ and $F_p$ are indicated the loads acting on the springs 4a, 6a respectively in a generally loaded condition of the vehicle.

By $y_A$ and $y_p$ are indicated the compressive strokes of the springs 4a and 6a respectively corresponding to the transition from the empty condition to the loaded condition of the vehicle. Finally, by $y_C$ is indicated the stroke of the hydraulic cylinder 9 corresponding to the loaded vehicle condition.

Supposing that in the empty vehicle condition corresponding to the application of the loads $F_{AO}$ and $F_{pO}$ the vehicle is situated in horizontal attitude, the condition for horizontality under any other condition of load is expressed by the following relation:

$$y_A = y_p + y_O - Y_C \qquad (1)$$

If $k_A$ and $k_p$ are the rigidities of the springs 42 and 52 respectively, the magnitudes of the strokes $y_A$ and $y_p$ are expressed by the following relations:

$$y_A = \frac{F_A - F_{AO}}{k_A} \qquad (2)$$

$$y_P = \frac{F_p - F_{pO}}{k_p} \qquad (3)$$

Substituting the relations (2) and (3) in the relation (1), an expression is obtained for the stroke $y_C$ which the hydraulic cylinder 9 must make in order to maintain the horizontal attitude of the motor vehicle in any condition of load on the suspensions:

$$Y_C = \frac{F_p - F_{pO}}{k_p} - \frac{F_A - F_{AO}}{k_A} + y_O \qquad (4)$$

In order for the slide valve 14 (see FIG. 5) associated with each hydraulic cylinder 9 to be situated in its position of equilibrium shown in FIG. 2, it is necessary for the following relation to be satisfied:

$$p_A A + y_C k_M + f_O = P_p A \qquad (5)$$

where:

A is the cross-sectional area of the slide valve 14;

$P_A$ is the pressure transmitted to the second inlet 20 of the hydraulic cylinder 9;

$p_p$ is the pressure existing in the internal chamber 12 of the hydraulic cylinder 9;

$f_O$ is the pre-load of the spring 26 associated with each hydraulic cylinder in correspondence with the condition $y_C = O$;

$k_M$ is the rigidity of the springs 26.

The magnitude of the pressure $P_A$ transmitted to the inlet 20 associated with each hydraulic cylinder 9 by means of the valve 27 and the pipes 22,21 is expressed by the following relation:

$$p_A = p_{AO} + y_A \frac{L_V}{L_B} \frac{K_V}{b} \quad (6)$$

where:
$p_{AO}$ is the pressure transmitted to the inlet 20 when the front suspensions are subject to the load $F_{AO}$,
$L_B$ is the length of the arm of the appendage 37 with respect to the axle 39 (see FIGS. 3,4),
$k_V$ is the rigidity of the spring 34 associated with the valve 27,
b is the cross-sectional area of the aperture 31.

Putting $L_V = \epsilon$ and taking into account the fact that $p_p = F_{p/s}$, where S is the cross-sectional area of the hydraulic cylinder (5) (see FIG. 2), if the expression (6) is substituted in the expressions (5), the following relation is obtained:

$$p_{AO}A + \frac{F_A - F_{AO}}{k_A} \epsilon \frac{k_V}{b} A + y_C k_M + f_O = \frac{F_p}{S} A; \quad (7)$$

This relation expresses the condition which must be satisfied in order for the slide valve 14 associated with each hydraulic cylinder 9 to be situated in its position of equilibrium shown by FIG. 2.

If it is desired to have the motor vehicle situated in horizontal attitude when the slide valve 14 is in its position of equilibrium, it is necessary that the expressions (4) and (7) be satisfied simultaneously.

Substituting the expression (4) in the expression (7), the following relation is obtained:

$$\frac{F_A - F_{AO}}{k_A}\left(\epsilon \frac{k_M}{b}A - k_M\right) + \frac{F_p - F_{pO}}{k_p}\left(k_M - k_p\frac{A}{S}\right) = \quad (8)$$

$$\frac{F_{pO}}{S}A + -p_{AO}A - y_O k_M - f_O$$

In conclusion, if it is desired to have the slide valve 14 situated in its position of equilibrium when the motor vehicle regains its horizontal attitude, it is necessary to arrange the system described above in such a way that the relation (8) is satisfied.

Since this relation is always satisfied, however the loads $F_A$ and $F_p$ vary, it is sufficient that the coefficients which appear in the relation (8) are zero.

The following three relations then derive from the relation (8):

$$\frac{k_M}{A} = \frac{k_V}{b}\epsilon \quad (9)$$

$$\frac{k_M}{A} = \frac{k_p}{S}; \quad (10)$$

$$F_{pO}\frac{A}{S} = p_{AO}A + y_O k_M + f_O \quad (11)$$

For the correct functioning of the system described above it is necessary, finally, that the pressure $p_A$ transmitted to the inlet 20 of each hydraulic cylinder (9) should always be less than or at most equal to the pressure $p_p$ existing in the internal chamber 12 of the hydraulic cylinder 9. This condition must necessarily be satisfied if it is desired that when the slide valve 14 is situated in its first end position, the internal chamber 12 of the hydraulic cylinder (9) is connected to exhaust through the pipe 20.

In the following treatment it is supposed that the condition in which the ratio $p_A p_p$ assumes its maximum value is that of an empty vehicle at maximum deceleration.

Supposing that $F^*_{AO}$ and $F^*_{PO}$ are the loads acting on the front suspension and on the rear suspension in the condition defined above, the relation $p_A \leq p_p$ becomes:

$$\frac{F^*_{pO}}{S} \geq p_{AO} + \frac{F^*_{AO} - F_{AO}}{k_A} \epsilon \frac{k_V}{b}. \quad (12)$$

In order for the system according to the present invention to function correctly in the manner which has been described above, it is therefore necessary that the relations (9), (10), (11) and (12) be satisfied.

FIG. 7 illustrates a variant of the hydraulic cylinder 9 shown in FIG. 2.

In the example of embodiment shown in FIG. 7, the cup element 10 forming part of the hydraulic cylinder 9 has a head 10a in which are formed the first inlet 16 intended to be connected to the pipe 17, the second inlet 20, intended to be connected to the pipe 21 and a third inlet 50 intended to be connected directly to the tank 19. Therefore, in the case where a hydraulic cylinder 9 of the type shown in FIG. 7 is used, the system shown in FIG. 1 includes a further pipe for the connection of the inlet 50 to the tank 19.

The inlet 16 communicates with the cavity 15 in which the slide valve is slidingly assembled 14 by means of an axial duct 16a and a radial duct 16b. The inlet 20 communicates with the chamber 15 by means of an axial duct 20a which leads to the upper end wall of the chamber 15. The inlet 50 communicates with the chamber 15 by means of an axial duct 50a and a radial duct 50b.

The slide valve 14 is provided with a circumferential groove which defines together with the wall of the cavity 15 an annular chamber 14a. The chamber 14a communicates with the internal chamber 12 of the hydraulic cylinder 9 by means of ducts 14b made inside the slide valve 14.

The cup element 11 forming part of the hydraulic cylinder has an axial cylinder appendage 51 protruding inside the chamber 12 from the head 11a of the element 11. The ends of the helical spring 26 are secured in correspondence with grooves 52, 53 made in an axial cylindrical appendage 54 fixed to the slide valve 14 and in the axial appendage 51 extending from the head 11a respectively. The free ends of the appendages 51,54 are situated in contact with each other when the chamber 12 is not filled with fluid coming from the pump 18, during the periods of non-utilization of the suspension system described above. In this condition (shown in FIG. 7) the slide valve 14 is maintained by the appendage 51 in its second end position, corresponding to the communication of the first inlet 16 with the internal chamber 12. In this manner, when the pump 18 is activated to deliver fluid to the internal chamber 12 of each hydraulic cylinder 9, the fluid which reaches the inlet 16 may get as far as the chamber 12. When sufficient pressure is reached inside the chamber 12, the consequent raising of the cup element 10 with respect to the cup element 11 makes it possible for the slide valve 14 to be brought into its intermediate position of equilibrium corresponding to the horizontal attitude of the motor vehicle.

We claim:

1. Suspension system for motor vehicles, of the type comprising:

means for sensing subsidence of the front suspensions of the motor vehicle, means for sensing subsidence of the rear suspensions of the motor vehicle, actuator means to vary the level of the suspended masses in correspondence with the rear axle of the motor vehicle, and control means, controlled by the said sensor means, designed to cause the operation of the said actuator means in order to maintain automatically the horizontal attitude of the motor vehicle upon variation in the loads on the front suspensions and on the rear suspensions, wherein (a) the said system comprises at least one hydraulic cylinder interposed between the springs of the rear suspension and the suspended masses of the motor vehicle, designed to function at the same time as actuator member and as the member for sensing the subsidence of the rear suspensions, the said hydraulic cylinder comprising two members, fixed respectively to the springs of the rear suspensions and to the suspended masses of the motor vehicle, which define between them an internal chamber, (b) the said system further comprises a tank and a hydraulic pump the inlet to which is connected to the tank and the outlet from which is connected to a first input of the said hydraulic cylinder through a first pipe, and to a second input of the said hydraulic cylinder through a second pipe, (c) the means for sensing the subsidence of the front suspensions comprise a control valve for controlling the pressure existing in the said second pipe, the said control valve comprising a movable control member designed to move as a function of the subsidence of the front suspensions in order to cause an increase in the pressure in the second pipe as the subsidence of the front suspensions increase.

(d) the control means comprise a distribution valve incorporated in one of the two members forming the hydraulic cylinder and including a slide valve subject at one of its ends to the pressure transmitted through the said second input and at its opposite end to the pressure existing in the internal chamber of the hydraulic cylinder; the said slide valve being movable between a first end position, corresponding pressure being transmitted through the said second input, in which the internal cavity of the hydraulic cylinder is connected to exhaust, so as to cause retraction of the hydraulic cylinder, and a second end position, corresponding to there being pressure in the internal chamber of the hydraulic cylinder, in which the said internal chamber is put in communication with the said first input, so as to cause extension of the hydraulic cylinder, (e) the control means further comprise a spring, acting as the member for sensing the variation in the length of the hydraulic cylinder, interposed between the slide valve associated with one of the two members forming the hydraulic cylinder and the other member of the hydraulic cylinder, the said spring being designed to bring the slide valve back into one of its positions of equilibrium in which the internal chamber of the hydraulic cylinder is isolated, when the vehicle becomes situated in horizontal attitude.

2. Suspension system according to claim 1, wherein the said system comprises twohydraulic cylinders interposed between the springs of the rear suspension and the suspended masses of the motor vehicle respectively.

3. Suspension system according to claim 1, wherein the hydraulic cylinder comprises two substantially cup-shaped elements assembled slidingly one inside the other with their internal cavities facing each other.

4. Suspension system according to claim 1, wherein the said control valve is interposed in a third pipe which connects the second pipe to the tank, the said control valve being designed to control the quantity of fluid which is discharged from the second pipe into the tank through the said third pipe, so as to control the pressure existing in the second pipe.

5. Suspension system according to claim 4, wherein in the first end position of the slide valve, the internal chamber of the hydraulic cylinder communicates with the tank by means of the second input, the second pipe, the control valve and the third pipe.

6. Suspension system according to claim 1, wherein in the first end position of the slide valve, the internal chamber of the hydraulic cylinder communicates with a third input of the hydraulic cylinder which is connected to the tank.

7. Suspension system according to claim 1, wherein the control valve comprises a non-return valve, comprising a valve seat, an obturator and elastic means designed to press the obturator against the valve seat, the said movable control member being mechanically connected to a stabilizing bar of the front wheels so as to cause an increase in the load of the said elastic means as the subsidence of the front suspensions of the motor vehicle increases.

8. Suspension system according to claim 7, wherein the said non-return valve comprises a body, two internal chambers which communicate respectively with the sections of the third pipe arranged upstream and downstream of the said valve, the said valve seat comprising the edge of an aperture made in a baffle which separates the two internal chambers from each other, the valve obturator and the elastic means designed to press the obturator against the valve seat comprising respectively a ball element arranged in the internal chamber which communicates through the third pipe with the tank and a helical spring interposed between the base element and the moveable control member.

9. Suspension system according to claim 8, wherein the movable control member forming part of the control valve comprises a member assembled slidingly in the body of the said valve and having one end protruding outside the said body, the said end being mechanically connected to a transverse lever fixed to the central section of the said stabilizing bar.

10. Suspension system according to claim 1, wherein the hydraulic cylinder is provided with stop means designed to maintain the slide valve in its first end position when the internal chamber of the hydraulic cylinder is not filled with fluid.

* * * * *